United States Patent [19]

Möeller et al.

[11] 4,402,854

[45] Sep. 6, 1983

[54] LIQUID CRYSTALS HAVING PLEOCHROIC DYES

[75] Inventors: Alexander Möeller; Günther Scherowsky, both of Berlin, Fed. Rep. of Germany

[73] Assignee: Siemens Aktiengesellschaft, Berlin & Munich, Fed. Rep. of Germany

[21] Appl. No.: 424,624

[22] Filed: Sep. 27, 1982

Related U.S. Application Data

[62] Division of Ser. No. 231,483, Feb. 4, 1981, Pat. No. 4,363,743.

[30] Foreign Application Priority Data

Feb. 26, 1980 [DE] Fed. Rep. of Germany ....... 3007198

[51] Int. Cl.³ .......................... C09K 3/34; G02F 1/13
[52] U.S. Cl. ................ 252/299.1; 260/376; 260/377; 350/349
[58] Field of Search ............... 350/349; 252/299.1; 260/376, 377

[56] References Cited

U.S. PATENT DOCUMENTS

| | | | |
|---|---|---|---|
| 3,147,284 | 9/1964 | Rhyner | 260/380 |
| 3,642,837 | 2/1972 | Greenhalch et al. | 260/380 |
| 3,960,751 | 7/1976 | Moriyama et al. | 252/299.1 |
| 4,118,498 | 10/1978 | Lang, Jr. et al. | 260/378 |
| 4,154,746 | 5/1979 | Huffman | 260/378 |
| 4,232,949 | 9/1980 | Huffman | 350/349 |
| 4,232,950 | 9/1980 | Benham | 350/350 R |
| 4,273,929 | 6/1981 | Boller et al. | 252/299.1 |
| 4,299,720 | 11/1981 | Osmam et al. | 252/299.1 |
| 4,304,683 | 12/1981 | Morinaka et al. | 252/299.1 |
| 4,360,447 | 11/1982 | Morinaka et al. | 252/299.1 |
| 4,363,743 | 12/1982 | Moeller et al. | 252/299.1 |

FOREIGN PATENT DOCUMENTS

| | | | |
|---|---|---|---|
| 2104 | 5/1979 | European Pat. Off. | 252/299.1 |
| 26004 | 4/1981 | European Pat. Off. | 252/299.1 |
| 38460 | 10/1981 | European Pat. Off. | 252/299.1 |
| 2400820 | 7/1974 | Fed. Rep. of Germany | 252/299.1 |
| 2445164 | 3/1975 | Fed. Rep. of Germany | 252/299.1 |
| 2815335 | 12/1978 | Fed. Rep. of Germany | 252/299.1 |
| 2920730 | 11/1979 | Fed. Rep. of Germany | 350/349 |
| 3009974 | 9/1980 | Fed. Rep. of Germany | 252/299.1 |
| 3028593 | 2/1981 | Fed. Rep. of Germany | 252/299.1 |
| 3036853 | 4/1981 | Fed. Rep. of Germany | 252/299.1 |
| 3038372 | 5/1981 | Fed. Rep. of Germany | 252/299.1 |
| 2037803 | 7/1980 | United Kingdom | 252/299.1 |
| 2069518 | 8/1981 | United Kingdom | 252/299.1 |
| 2074182 | 10/1981 | United Kingdom | 252/299.1 |

OTHER PUBLICATIONS

Saeva, F. D., Xerox Disclosure J., vol. 1, Nos. 9/10, pp. 61–62 (1976).
Cognard, Jr., et al., Mol. Cryst. Liq. Cryst., vol. 70, pp. 1–19 (1981).
Cox, Mol. Cryst. Liq. Cryst., vol. 55, pp. 1–32 (1979).
Heilmeier, et al., Appl. Phys. Lett., vol. 13, No. 3, pp. 91–92 (1968).
Constant, J., et al., Electronics Letters, vol. 12, No. 20, pp. 514–515 (1976).
White, D. L., et al., J. Appl. Phys., vol. 45, No. 11, pp. 4718–4723 (1974).
Bloom, A., et al., IEEE Trans Ed., vol. ED-24, No. 7, pp. 823–826 (1977).

*Primary Examiner*—Teddy S. Gron
*Attorney, Agent, or Firm*—Hill, Van Santen, Steadman & Simpson

[57] ABSTRACT

Anthraquinone dyes of the general formula:

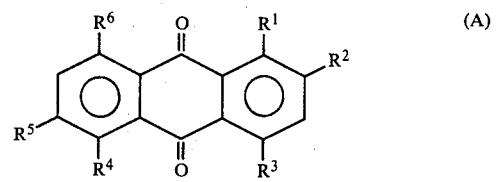

(A)

wherein $R^1$, $R^3$, $R^4$ and $R^6$ are selected from the group consisting of H, OH, OCH$_3$, NO$_2$, NH$_2$ and NHCH$_3$; $R^2$ and $R^5$ are selected from the group consisting of:
(a) alkyl-, aryl-, alkaryl-, alkoxyaryl-, aminoaryl-, alkylaminoaryl-, dialkylamino-, arylaminoaryl- or,

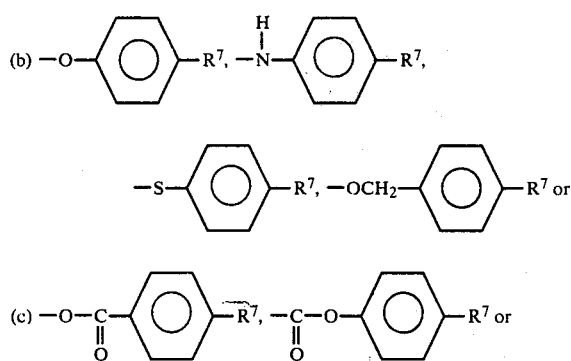

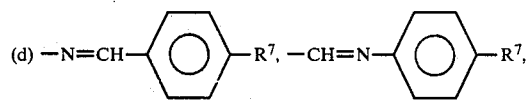

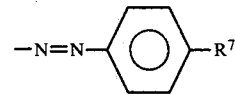

wherein $R^7$ is selected from the group consisting of alkyl-, aryl-, amino-, alkylamino-, dialkylamino-, arylamino-, alkyloxy-, and aryloxy radicals, along with their syntheses routes are disclosed. The dyes are particularly useful in liquid crystal displays which function with a "guest host" effect or in other electrooptical display devices having a medium therein switchable between different ordering states.

4 Claims, 2 Drawing Figures

LIQUID CRYSTALS HAVING PLEOCHROIC DYES

This is a division, of application Ser. No. 231,483, filed Feb. 4, 1981, now U.S. Pat. No. 4,363,743.

BACKGROUND OF THE INVENTION

1. Field of the Invention

The invention relates to anthraquinone dyes and somewhat more particularly to pleochromatic anthraquinone dyes, their synthesis and utilization.

2. Prior Art

Intensive work has been under way for a considerable period of time to develop a so-called "absorptive" liquid crystal display in which a pleochromatic dye is provided as an additive in a liquid crystal layer (see Applied Physics Letters, Vol. 38, page 91, 1968). Such a display is particularly characterized in that it provides a large angular range of observation and operates without polarizers. Despite these attractive properties, liquid crystal displays with dye additives have not yet become completely competitive with more conventional displays primarily due to the fact that no dye has yet been developed which not only dissolves in a sufficient amount in available liquid crystal materials and is stable over prolonged storage and operating time periods which also provides acceptable contrast.

Primarily, a display contrast depends on the degree to which the liquid crystal molecules can transfer their respective orientation state to an embedded dye molecule. Characteristics for the degree of ordering of a dye molecule is the magnitude $S = \frac{1}{2}(3<\cos^2> - 1)$, which is attained by means of averaging over the angle between the individual dye molecules and the director of the liquid crystal grid.

In an ideal situation, when all dye molecules lie parallel to the preferred direction of the liquid crystal molecules, S assumes the value 1 and, in practice lies clearly below such value. (Calculation feasibilities for S as well as the interrelationships between the ordering parameters and the contrast perceived by an observer are set forth in IEEE Trans. on Electron Devices, Vol. ED-24, page 823, 1977).

Specific azo dyes which, for example, are described in Electronics Letters, Vol. 12, page 514, 1976, have a relatively high degree of ordering. However, it has been noted that it is precisely those azo compounds which have the highest S values (with $S=0.79$) and the greatest coefficients of absorption, decompose even after a few 1000 hours and quickly fade under UV loads.

Anthraquinone-based dyes are relatively stable and were therefore early investigated for their suitability as additives in liquid crystal layers. Thus, German Auslegeschrift No. 24 45 164 describes 1,4-alkyl-phenylamino anthraquinones as well as 1,4- and 1,8-alkylamino anthraquinones but, from the data presented in this prior art publication, these anthraquinones only effect a weak image contrast. If, as suggested in German Offenlegungsschrift No. 28 15 335, the anthraquinone ring is substituted at its 1 and 4 position or, respectively, 1 and 8 positions, with the radical $-N=CH-C_6H_4-X$ (wherein $C_6H_4$ is a phenyl group and X is selected from the group consisting of a nitro-, cyano-, phenyl-, $C_{1-20}$-alkyl-, $C_{1-20}$-alkoxy- or a di-$C_{1-4}$-alkylamino group), a relatively high degree of ordering is attained. The peak values of 0.9 and above described in German Offenlegungsschrift No. 28 15 335, however, cannot be reproduced with the pertinent liquid crystal/dye mixtures.

Further, this class of compounds is available in only a very few colors; with the anthraquinone ring substituted at the 1 and 4 position being blue, and the anthraquinone ring substituted at the 1 and 8 position having a reddish coloration.

A somewhat greater color spectrum is available when, as suggested in European Offenlegungsschrift No. 0 00 21 04, the anthraquinone ring is substituted at its 1, 4 and 5 positions as follows: an anilino-group (substituted or modified) is at the 1 position; either hydrogen or a hydroxyl group is positioned at the 4 position; and the 5-position radical is, in a first instance, an anilino group (substituted or modified) and, in a second instance, a hydrogen radical. Chemically, particularly photochemically, this class of dyes is extraordinarily resistant to degradation but does not orientate particularly well; further, as a rule, the S-values for these groups of compounds remain below 0.7 and at best achieve an S-value of 0.71.

SUMMARY OF THE INVENTION

The invention provides a class of stable pleochromatic anthraquinone dyes which are sufficiently soluble in liquid crystal material, exhibit good alignment properties with liquid crystal materials and can be selectively varied in color by simple changes in their molecular structure.

Somewhat more particularly, the invention provides pleochromatic anthraquinone dyes having the general formula:

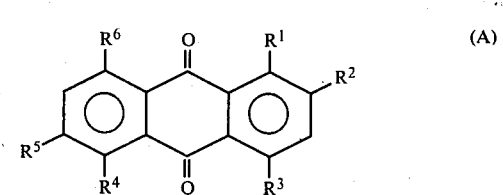

(A)

wherein $R^1$, $R^3$, $R^4$ and $R^6$ are selected from the group consisting of H, OH, $OCH_3$, $NO_2$, $NH_2$ and $NHCH_3$; and $R^2$ and $R^5$ are selected from the group consisting of:

(a) alkyl-, aryl-, alkaryl-, alkoxyaryl-, aminoaryl-, alkylaminoaryl-, dialkylaminoaryl, arylaminoaryl- or (b) 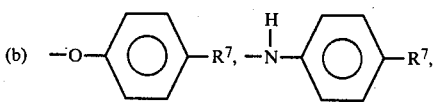

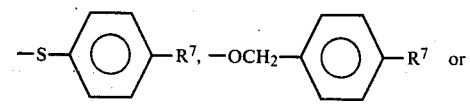

(c) 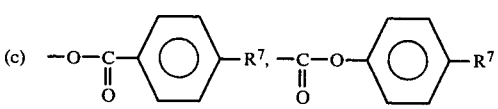

(d) 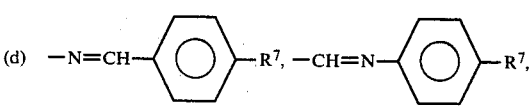

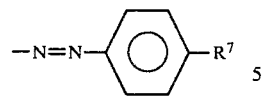

wherein $R^7$ is selected from the group consisting of alkyl-, aryl-, amino-, alkylamino-, dialkylamino-, arylamino-, alkyloxy-, and aryloxy radicals, along with syntheses routes therefor. The dyes are particularly useful in liquid crystal displays which function with a "guest host" effect or in other electrooptical display devices having a medium therein switchable between different ordering states.

The pleochromatic anthraquinone dyes of the invention are primarily useful in liquid crystal displays. However, such dyes are also useful as additives to other light-modulating fluids, for instance agents which are deformed into diffraction grids by means of impressed electrode changes (see in this regard German Offenlegungsschrift No. 24 00 820) or as an additive in a medium of an electrooptical display device, which is switchable between differing ordering states.

The molecules of the anthraquinone dyes of the invention, which are substituted at the 2 and 6 position of the anthraquinone ring or, respectively, at the substantially equivalent 3 and 7 position, have very elongated, relatively slender shapes and thus readily fit into a host grid. Measurements have shown that these molecules readily exhibit S-values above 0.75 and that such values depend only slightly on the particular liquid crystal material or mixture utilized. Further, the anthraquinone dyes of the invention can be synthesized without particular difficulty and with relatively good yields. The color of the anthraquinone dyes of the invention can be changed within relatively wide boundaries by selection of suitable radicals $R^2$ and $R^5$ (identified above), which not only are meant to extend the anthraquinone ring itself, but can also contain chromophores, as well as by selective variations of the radicals $R^1$, $R^3$, $R^4$ and $R^6$ (identified above). All of the anthraquinone dyes of the invention tested exhibited only a slight relaxation of their absorbability, even after relatively long UV irradiation time periods.

DESCRIPTION OF PREFERRED EMBODIMENTS

The invention provides pleochromatic anthraquinone dyes having the general formula (A) set forth earlier, synthesis thereof and utility thereof.

A group of preferred pleochromatic anthraquinone dyes of formula (A) have $R^2$ and $R^5$ each composed of

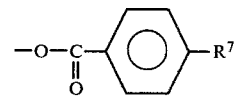

and preferred dyes from this group comprise 1,5-diamino-2,6-di-[trans-4-(4n-pentyl-cyclohexyl)-benzoyloxy]-anthraquinone or 2,6-di-[4-(p-N,N-dimethylanilino-azo)-benzoyloxy]-anthraquinone or 2,6-di-[4-(4-pentoxyphenylazo)-benzoyloxy]-anthraquinone.

Another group of preferred pleochromatic dyes of formula (A) have $R^2$ and $R^5$ each composed of

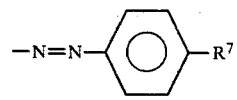

and preferred dyes from this group comprise 2,6-di-(p-dimethylanilino-azo)-anthraquinone or 2,6-di-(4-pentoxyphenyl-azo)-anthraquinone.

Another group of preferred pleochromatic anthraquinone dyes of formula (A) have $R^2$ and $R^5$ each composed of

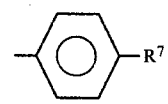

and a preferred dye from this group is 1,5-diamino-4,8-dihydroxy-3,7-di-(4-pentoxyphenyl)-anthraquinone.

Particularly preferred pleochromatic anthraquinone dyes of the invention comprise a 1,5-diamino-4,8-dihydroxy-3,7-di-(4-methoxyphenyl)-anthraquinone or a 1,5-diamino-4,8-dihydroxy-2,6-diphenyloxy-anthraquinone.

The first group of the above-identified preferred pleochromatic dyes of the invention are synthesized by first diluting oxalylchloride with acetonitrile and dropping the resultant mixture into a cooled solution of dimethylformamide and acetonitrile, adding an $R^7$-substituted (defined in formula (A)) benzoic acid to the resultant admixture while stirring and thereafter, after holding for a relatively brief period of time in a cooled environment, adding a corresponding 2,6-dihydroxyanthraquinone dissolved in pyridine and thereafter heating the admixture solution to room temperature, with stirring, over a period of a few hours and thereafter precipitating a product from such admixture solution by the addition of a sodium carbonate solution, sucking-off the product and drying such product in vacuum.

A method of synthesizing the other group of preferred pleochromatic anthraquinone dyes defined above comprises dissolving 2,6-diaminoanthraquinone in concentrated sulfuric acid, cooling the resultant reaction solution and diazotizing such solution with sodium nitrite, with stirring for a few hours and thereafter pouring the reaction solution onto ice so as to precipitate a diazonium salt, sucking-off the salt and coupling the salt with dimethylaniline or phenol, and after alkylating in the case of a phenol coupling, processing the resultant product in a standard manner, drying the same and finally chromatographing the product.

The pleochromatic anthraquinone dyes of formula (A) defined above, are useful as an additive to a medium switchable between differing ordering states positioned in an operable electrooptical display device. Preferably, such switchable medium is a liquid crystal material.

Figure 1:
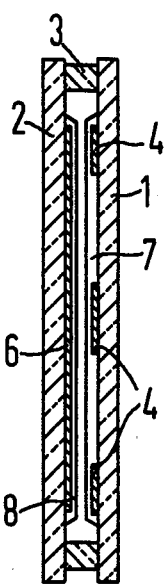
FIG. 1 is an elevated schematic view of an operable liquid crystal display utilizing the anthraquinone dyes of the invention.

Referring now to the drawings, FIG. 1 illustrates an operative liquid crystal display comprised of two carrier plates 1, 2, positioned parallel to one another and attached to one another via a frame means 3. Each plate supports conductive coatings (separably drivable segmented electrodes 4 on plate 1 and a continuous back electrode 6 on plate 2) as well as plate-parallel orientating layers 7 and 8 on their respective side surfaces facing one another. A cholesteric liquid crystal material in which a pleochromatic dye of the invention is added, is positioned in the chamber defined by the frame means and the two carrier plates. The liquid crystal layer has a positive dielectric anisotropy and is switchable between a planar-cholesteric and a homeotropic-nematic orientation. The general structure and operating principles of such liquid crystal displays are well known and further details may be obtained, for example, from J. Appl. Phys., Vol. 45, Page 4718 (1974).

The selection of any one specific pleochromatic anthraquinone dye of the invention depends on the requirements of a given case. In order to further describe the properties of individual compounds of the inventive dyes, a few exemplary examples are set forth in greater detail below. However, these examples are not to be construed as limiting the scope of the invention in any way.

EXAMPLE 1

1,5-diamino-2,6-di-[trans-4-(4n-pentyl-cyclohexyl)-benzoyloxy]-anthraquinone having the formula:

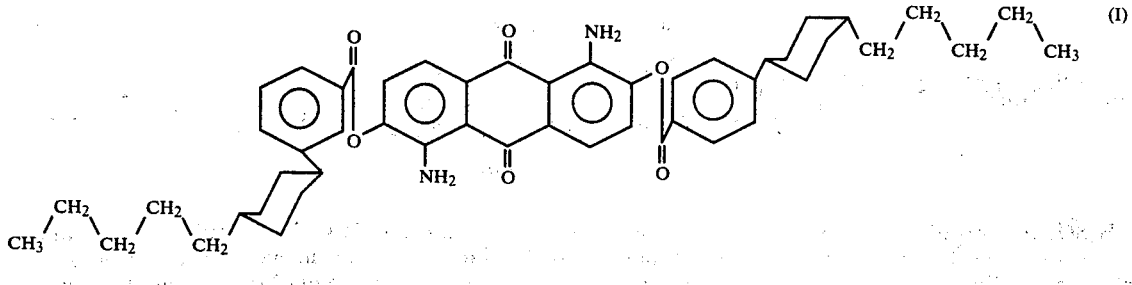

is synthesized as follows:

2 ml of oxalylchloride and 2 ml of acetonitrile were dropped into a solution of dimethylformamide and 12 ml of acetonitrile, cooled to $-20°$ C. Thereafter, while stirring, 5.48 gr (0.02 mol) of trans-4-(4n-pentyl-cyclohexyl)-benzoic acid was added to the cooled solution. After a short time period, 3.3 gr (0.01 mol) of 2,6-dihydroxy-1,5-dinitro-anthraquinone dissolved in 100 ml pyridine was trickled into the solution while the solution was being maintained at $-20°$ C. This reaction solution was then heated to room temperature and stirred for 18 hours. A product was precipitated out of the reaction solution by adding 2 N sodium carbonate solution thereto and this product was then sucked-off and dried in vacuum (Yield 51%). Upon analysis, the following properties were noted:

Melting point 240° C. (with decomposition); $\lambda_{max}$ (DMSO/Methanol 5:5)–500 nm; $^1$H-NMR (D$_6$-DMSO): $=0.9$ (t, J$=5$ Hz, 6 H, CH$_2$C$\underline{H}_3$), 1.1–1.4 (m, 32H, —C$\underline{H}_2$—), 1.75 (s, br, 2H, $$-CH_2-\overset{|}{C}H-CH_2-),$$

1.85 (s, br, 2H, $$-CH_2-\overset{|}{C}H-CH_2-),$$

6.95 (d, J$=8$ Hz, 2H), 7.35 (d, J$=8$ Hz, 4H, Ar-H) 7.45 (d, J$=8$ Hz, 2 H, Ar-H) 7.85 (d, J$=8$ Hz, 4H, Ar-H).

EXAMPLE 2

2,6-di-[4-(p-N,N-dimethylanilino-azo)-benzoyloxy]-anthraquinone having the formula:

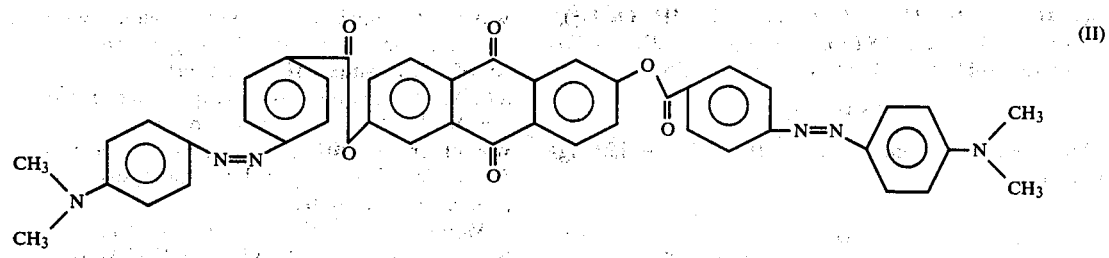

was synthesized from 4-(p-N,N-dimethylanilino-azo)-benzoic acid and 2,6-dihydroxy-anthraquinone in accordance with the procedure described in Example 1 (Yield 34%). Upon analysis, the following properties were noted:

Melting point 270° C. (with decomposition); $\lambda_{max}$ (CHCl$_3$)$=450$ nm; $^1$H-NMR (CF$_3$CO$_2$D) $\delta=3.65$ (s, 12H, NC$\underline{H}_3$), 7.25 (d, J$=9$ Hz, 4H, Ar—H), 7.8–8.5 (m, 10, Ar—H, 8.35–8.7 (m, 8H, Ar—H), S$=0.75$ in RO TN 570.

EXAMPLE 3

2,6-di-[4-(4-pentoxyphenylazo)-benzoyloxy]-anthraquinone having the formula:

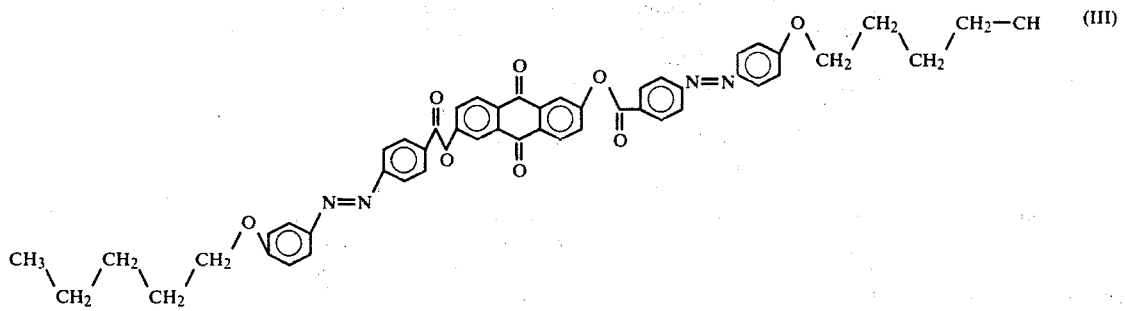

was synthesized from 4-(p-pentyloxyphenylazo)-benzoic acid and 2,6-dihydroxy-anthraquinone in accordance with the procedure described in Example 1 (Yield 63%). Upon analysis, the following properties were noted:

Melting point 200° C. (with decomposition); $\lambda_{max}$ (CHCl$_3$)=370 nm; $^1$H-NMR (CF$_3$CO$_2$D): δ=1.0 (t, J=6 Hz, 6H, CH$_2$C$\underline{H}_3$), 1.55 (mφ, 8H, C$\underline{H}_2$CH$_3$), 2.0 (mφ, 4H, OCH$_2$-C$\underline{H}_2$), 4.45 (t, J=8 Hz, 4H, OC$\underline{H}_2$), 7.35 (d, J=9 Hz, 4H), 7.8 (dd, J=8 and 1 Hz, 2H, Ar-H) 8.1–8.6 (m, 16H, Ar—H) S$^i$=0.70 in RO TN 570.

EXAMPLE 4

2,6-di-(p-dimethylanilino-azo)-anthraquinone having the formula:

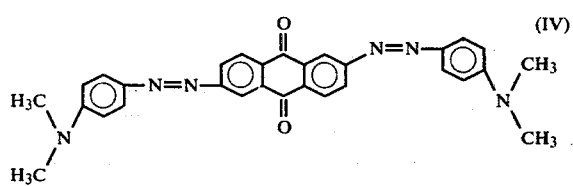

was synthesized as follows: 0.48 gr (2 m mol) of 2,6-diaminoanthraquinone were dissolved in 10 ml concentrated H$_2$SO$_4$ and was diazotized at 10° C. with 0.3 gr (4.4 m mol) sodium nitrite, stirred for 18 hours and thereafter the resultant solution was poured onto ice. The diazonium salt so-obtained was sucked-off, suspended in 10 ml 50% sulfuric acid and was coupled with 0.48 gr (4 m mol) of N,N-dimethylaniline (dissolved in 10 ml of 2 N sulfuric acid) at 15° C. After termination of the reaction, the mixture was neutralized with sodium carbonate, the precipitate was sucked-off, dried and chromatographed on silica gel (Yield 61%). Upon analysis, the following properties were noted:

Melting point 170° C. (with decomposition); $\lambda_{max}$ (CHCl$_3$)=510 nm; $^1$H-NMR (CF$_3$CO$_2$D): δ=3.7 (s, 12H, NC$\underline{H}_3$), 7.35 (d, J=9 Hz, 4H), 8.0–8.2 (m, 6H) 8.45–8.65 (m, 4H); S=0.72 in RO TN 570.

EXAMPLE 5

2,6-di-(4-pentoxyphenyl-azo)-anthraquinone with the formula:

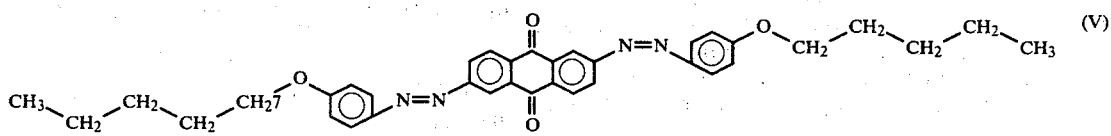

was synthesized in an analogous manner, with the diazotization occurring analogously to the method described in Example 4. The coupling was carried out in an alkaline medium with an equimolar amount of phenol. In the obtained coupling product, the sodium salt was etherized with excess pentyl iodine in dimethylformamide (Yield 19%). Upon analysis, the following properties were noted:

Melting point 150° C. (with decomposition); $\lambda_{max}$ (CHCl$_3$)=350 nm; $^1$H-NMR (CF$_3$CO$_2$D): δ=1.0 (t, J=5 Hz, 6H, CH$_2$C$\underline{H}_3$), 1.5 (m, 8H, C$\underline{H}_2$CH$_2$CH$_3$), 2.0 (m, 4H, OCH$_2$C$\underline{H}_2$), 4.5 (t, J=7 Hz, 4H, OC$\underline{H}_2$), 7.45 (d, J=9 Hz, 4H, Ar—H) 8.5–8.65 (m, 8H, Ar-H) 9.05 (d, J=1 Hz, 2H, Ar-H).

EXAMPLE 6

1,5-diamino-4,8-dihydroxy-3,7-di(4-pentoxyphenyl)-anthraquinone having the formula:

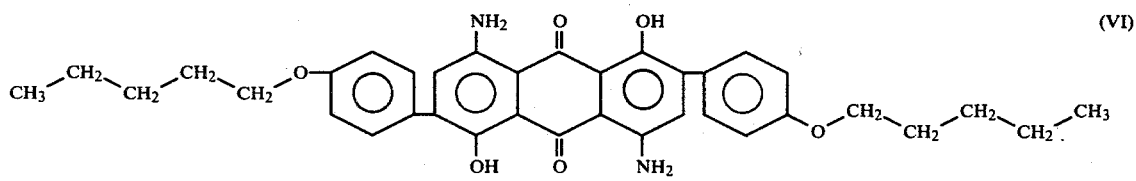

was synthesized as follows: 3.3 gr (0.01 mol) of 1,5-dihydroxy-4,8-dinitro-anthraquinone were dissolved at 20° C. in a mixture consisting of 60 ml concentrated sulfuric acid and 5.02 gr boric acid. After cooling the resultant solution to −18° C., 3.28 gr (0.02 mol) of phenylpentylether were dropped in to the solution within about 30 minutes and stirred for 1 hour at this temperature. Thereafter, this mixture was poured into ice and the boric acid ester was destroyed by heating for 1 hour. The precipitate obtained was sucked-off, washed neutral and dried in a vacuo. 3.8 gr of a material mixture was thus obtained and it was subjected to a repeated arylation. 4.5 gr of crude product was obtained. 1.5 gr of such crude product was reduced with 0.42 gr (0.009 mol) of sodium borhydride in isopropanol. After pouring this reduced crude product into water, it was centrifuged and dried in a vacuo. 1.2 gr of product were obtained from which 0.2 gr of a diaryl compound was isolated by means of chromatography over silica gel. Upon analysis, the following properties were noted:

Melting point 180° C.; $\lambda^1_{max} = 633$ nm, $\lambda^2_{max} = 595$ nm; $^1$H-NMR (D$_6$DMSO): $\delta = 0.9$ (t, J=7 Hz, 6H, CH$_2$-CH$_3$), 1.1–1.5 (m, 8H, CH$_2$-CH$_2$CH$_3$), 1.6–1.85 (m, 4H, O—CH$_2$CH$_2$—), 4.05 (t, J=7 Hz, 4H, O-CH$_2$), 7.05 (d, J=8 Hz, 4H, Ar—H), 7.2 (s, 2H, Ar—H), 7.55 (d, J=8 Hz, 4H, Ar—H), 8.0 (s, br, 6H, —NH$_2$, —OH), MS (190° C.): m/e=594 (1% M+), 432 (30%, C$_{11}$H$_{14}$O); S$^1$=0.79, S$^2$=0.75.

EXAMPLE 7

1,5-diamino-4,8-dihydroxy-3,7-di(4-methoxyphenyl-)anthraquinone with the formula:

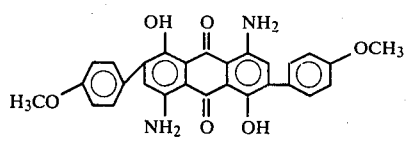

was synthesized in a manner analogous to that described in Example 6. Upon analysis, the following properties were noted:

Melting point 190° C.; $^1$H-NMR (D$_6$DMSO): $\int = 3.85$ (s, 6H, O-CH$_3$), 7.05 (d, J=8 Hz, 4H, Ar-H), 7.2 (s, 2H, Ar-H), 7.6 (d, J=Hz, 4H, Ar—H), 7.95 (s, br, 6H, —NH$_2$, —OH), MS (145° C.): m/e 482 (2%, M+), 374 (60%, M-C$_7$H$_5$O).

EXAMPLE 8

1,5-diamino-4,8-dihydroxy-2,6-diphenyloxy-anthraquinone having the formula:

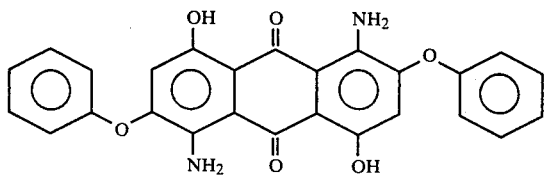

was prepared in the following manner:

A mixture of 4.28 g (0.01 mol) 1.5-diamino-2,6-dibromo-4,8-dihydroxy-anthraquinone, 25.4 g (0.27 mol) phenol and 3.5 g (0.03 mol) sodium carbonate was heated at 140° C. for 48 hr. After cooling to 80° C. the reaction mixture was poured into 70 ml 2 n sodium hydroxide solution. The precipitate was centrifuged and washed with water until the washing water became colorless, and dryed in vacuo. Upon analysis the following properties were noted:

Melting point 235° C.; MS (220° C.): m/e=454 (96%, M+), $\lambda^1_{max}$(acetone)=590 nm, $\lambda^2_{max}$ acetone=620 nm.

As has been pointed out earlier, with the inventive dye compounds, the degrees of ordering and the position of the absorption maximums changes only slightly to the host material. When 1,5-diamino-4,8-dihydroxy-3,7-di(4-methoxyphenyl)-anthraquinone (Example 7) was admixed in a few standard liquid crystal mixtures, the following values were attained:

TABLE 1

| Liquid Crystal | $\lambda_{max}^1$ [nm] | A$_\|$$^1$ | A$_\perp$$^1$ | S$^1$ | $\lambda_{max}^2$ [nm] | A$_\|$$^2$ | A$_\perp$$^2$ | S$^2$ |
|---|---|---|---|---|---|---|---|---|
| ZLI 1132 | 596 | 0.855 | 0.094 | 0.73 | 638 | 1.071 | 0.120 | 0.73 |
| ZLI 1221 | 596 | 0.787 | 0.096 | 0.71 | 643 | 0.990 | 0.119 | 0.73 |
| ZLI 1291 | 598 | 0.729 | 0.080 | 0.73 | 644 | 0.924 | 0.102 | 0.73 |
| RO TN 401 | 600 | 0.774 | 0.082 | 0.74 | 645 | 0.982 | 0.109 | 0.73 |
| RO TN 403 | 604 | 0.762 | 0.082 | 0.73 | 645 | 0.973 | 0.108 | 0.73 |
| RO TN 404 | 602 | 0.656 | 0.062 | 0.76 | 644 | 0.837 | 0.078 | 0.76 |
| RO TN 993 | 600 | 0.707 | 0.090 | 0.70 | 640 | 0.894 | 0.114 | 0.70 |
| E 8 | 602 | 0.601 | 0.076 | 0.70 | 644 | 0.764 | 0.096 | 0.70 |

In the foregoing Table, ZLI 1132, ZLI 1121 and ZLI 1291 are trade designations of Merck & Co. Inc., for commercially available liquid crystal materials; RO TN is a trade designation of Hoffmann-LaRoche for a series of commercially available liquid crystal materials; and "E 8" is a trade designation of BDH Chemicals, Ltd., for a commercially available liquid crystal material mixture. $\lambda^1_{max}$ and $\lambda^2_{max}$ are the wave lengths at which each respective dye exhibits a defined absorption maximum. The designations A$^i_\|$ and A$_\perp^i$ (with i=1,2) represent optical densities in random units measured at 80 $^i_{max}$ (in one instance, for light (A$_\|$$^i$) polarized parallel to the preferential direction of the dye molecule and, in another instance, for light (A$_\perp^i$) which oscillates in a direction perpendicular thereto). The ordering parameter, S$^i$, was calculated from the relation:

$$S^i = \frac{A_\|^i - A_\perp^i}{A_\|^i + 2A_\perp^i} \tag{B}$$

The respective measurements were taken with 0.5% solutions at room temperature. The 1,5-diamino-4,8-dihydroxy-3,7-di-(4-methoxyphenyl)-anthraquinone can be dissolved to more than 1.5% in all of the carrier liquid crystal materials utilized. The other anthraquinone dyes of the invention exhibit similar solubility parameters.

Figure 2:
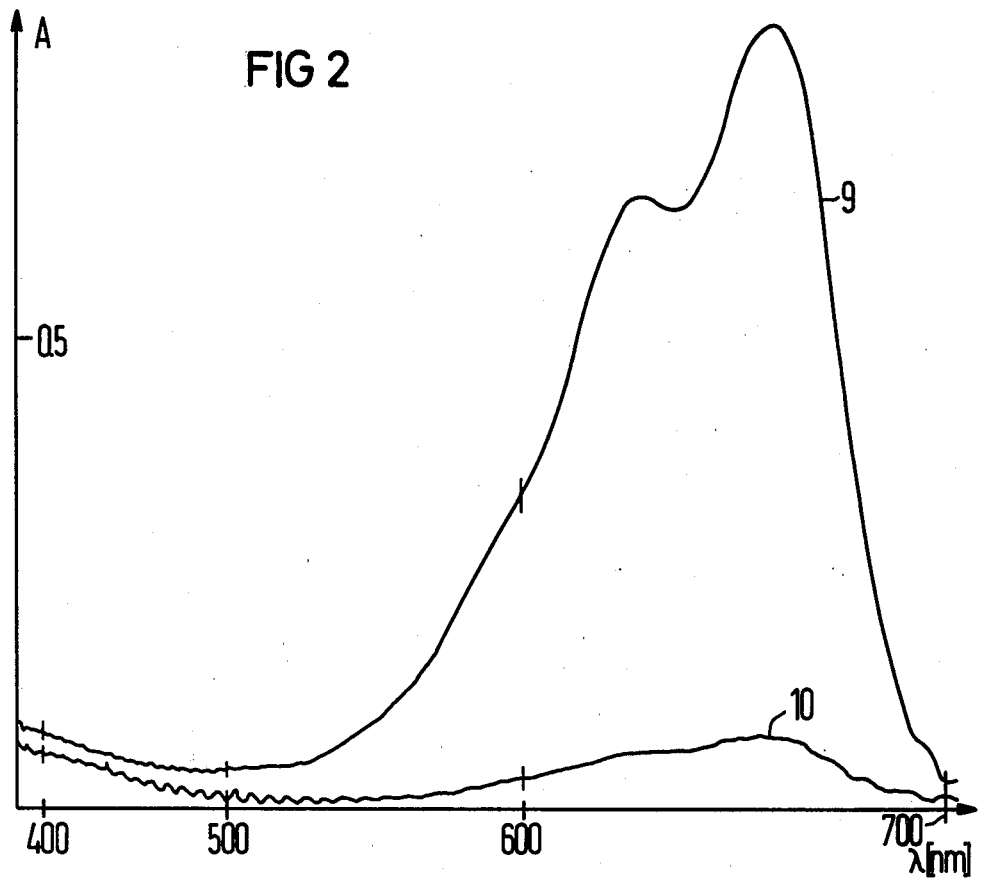
FIG. 2 is a graphical illustration illustrating the absorption spectra of an anthraquinone dye of the invention for light which is polarized parallel or, respectively, perpendicular to the longitudinal axes of a parallelly aligned dye molecule.

FIG. 2 illustrates the absorption behaviour of 1,5-diamino-4,8-dihydroxy-3,7-di-(4-methoxyphenyl)-anthraquinone in RO TN No. 404. The measured values A$_\|$$^i$ (curve 9) and A$_\perp^i$ (curve 10) are entered over the wavelength. The absorption spectra of the other dyes in other liquid crystal materials differ from the illustrated curves primarily only in that they are minimally displaced toward smaller or greater wavelengths.

The manner in which the ordering parameter, S$^i$, is influenced by the type and size of the respective dye molecules as well as by the quality of the liquid crystal material is not presently understood from the existing data. However, the dyes have a tendency in liquid crystal mixtures which are related to one another, for example, the RO TN group or the ZLI group, to order all the better, the higher the clarification temperature is for each individual group member. This can be attributed to the fact that, at room temperature, liquid crystal molecules themselves are more fully aligned when the mesophase extends up to higher temperatures.

Of course, the invention is not limited to the exemplary embodiments described above. Thus, it is not absolutely necessary for R$^2$ and R$^5$ (of Formula A) to be identical radicals. Further, it is up to the discretion of one skilled in the art to select those radical combinations from the multitude of possible radical combinations, through routine experimentation, to attain a dye with optimum properties for a specific case.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim:

1. A liquid crystal composition containing a pleochroic dye wherein the pleochroic dye is an anthraquinone dye having the general formula:

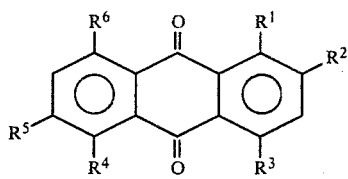

wherein $R^1$, $R^3$, $R^4$ and $R^6$ are selected from the group consisting of H, OH, OCH$_3$, NO$_2$, NH$_2$ and NHCH$_3$; and $R^2$ and $R^5$ are each

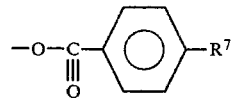

wherein $R^7$ is selected from the group consisting of alkyl-, aryl-, amino-, alkylamino-, dialkylamino-, arylamino-, alkyloxy-, and aryloxy radicals.

2. A liquid crystal composition containing a pleochroic anthraquinone dye wherein said dye comprises a 1,5-diamino-2,6-di-[trans-4-(4n-pentylcyclohexyl)-benzoyloxy]-anthraquinone.

3. A liquid crystal composition containing a pleochroic anthraquinone dye wherein said dye comprises a 2,6-di-[4-(p-N,N-dimethylanilino-azo)benzoyloxy]-anthraquinone.

4. A liquid crystal composition containing a pleochroic anthraquinone dye wherein said dye comprises a 2,6-di[4-(4-pentoxyphenylazo)-benzoyloxy]-anthraquinone.

* * * * *